(12) United States Patent
Hiratsuka

(10) Patent No.: US 12,241,797 B2
(45) Date of Patent: Mar. 4, 2025

(54) GENERATION METHOD, GENERATION DEVICE, GENERATION SYSTEM, PROGRAM, AND STORAGE MEDIUM

(71) Applicant: KABUSHIKI KAISHA TOSHIBA, Tokyo (JP)

(72) Inventor: Daisuke Hiratsuka, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 473 days.

(21) Appl. No.: 17/653,014

(22) Filed: Mar. 1, 2022

(65) Prior Publication Data

US 2023/0064648 A1 Mar. 2, 2023

(30) Foreign Application Priority Data

Aug. 26, 2021 (JP) ................................ 2021-138092

(51) Int. Cl.
*G01K 3/10* (2006.01)
*G01N 25/20* (2006.01)

(52) U.S. Cl.
CPC ............. *G01K 3/10* (2013.01); *G01N 25/20* (2013.01)

(58) Field of Classification Search
None
See application file for complete search history.

(56) References Cited

U.S. PATENT DOCUMENTS

2007/0234781 A1 10/2007 Yamada et al.
2008/0318347 A1 12/2008 Yasuda

| | | | |
|---|---|---|---|
| 2014/0269228 A1* | 9/2014 | Konishi | C25D 3/562 148/426 |
| 2015/0136280 A1* | 5/2015 | Hirakawa | C21D 11/00 148/95 |
| 2016/0258860 A1* | 9/2016 | Nishida | G01N 17/006 |

(Continued)

FOREIGN PATENT DOCUMENTS

| JP | 2002-329187 A | 11/2002 |
|---|---|---|
| JP | 2005-133158 A | 5/2005 |
| JP | 2007-264796 A | 10/2007 |

(Continued)

OTHER PUBLICATIONS

Gabriel Kerbart, et al., "Master sintering curve with dissimilar grain growth trajectories: A case study on $MgAl_2O_4$," Journal of the European Ceramic Society, vol. 41, XP086314457, 2021, pp. 1048-1051.

(Continued)

*Primary Examiner* — Roy Y Yi
(74) *Attorney, Agent, or Firm* — Oblon, McClelland, Maier & Neustadt, L.L.P.

(57) ABSTRACT

In a generation method according to one embodiment, a master curve of a relationship between an extent of reaction and a heat treatment condition is generated using a thermal analysis result of a member. Also, in the generation method, first data that is related to a first heat treatment condition of a relationship between time and temperature is generated using the first heat treatment condition and the master curve. Also, in the generation method, a second heat treatment condition of a relationship between time and temperature is calculated using the master curve and a target condition for heat treatment.

8 Claims, 8 Drawing Sheets

(56) References Cited

U.S. PATENT DOCUMENTS

2020/0104542 A1    4/2020  Obara et al.

FOREIGN PATENT DOCUMENTS

| | | |
|---|---|---|
| JP | 2007-334642 A | 12/2007 |
| JP | 2009-33110 A | 2/2009 |
| JP | 2016-17202 A | 2/2016 |
| JP | 2017-167663 A | 9/2017 |
| JP | 2018-128999 A | 8/2018 |
| JP | WO 2018/142840 A1 | 8/2018 |
| JP | 2019-125021 A | 7/2019 |
| JP | 2019-173166 A | 10/2019 |
| WO | WO 2018/042840 A1 | 3/2018 |

OTHER PUBLICATIONS

Junichi Tatami, et al., "Analysis of sintering behavior of silicon nitride based on master sintering curve theory of liquid phase sintering," Journal of the Ceramic Society of Japan, vol. 124, No. 4, XP055979241, 2016, pp. 375-380.

Hunghai Su, et al., "Master Sintering Curve: A Practical Approach to Sintering," Journal of the American Ceramic Society, vol. 79, No. 12, XP055979243, Dec. 1996, pp. 3211-3217.

* cited by examiner

GENERATION METHOD, GENERATION DEVICE, GENERATION SYSTEM, PROGRAM, AND STORAGE MEDIUM

CROSS-REFERENCE TO RELATED APPLICATIONS

This application is based upon and claims the benefit of priority from Japanese Patent Application No. 2021-138092, filed on Aug. 26, 2021; the entire contents of which are incorporated herein by reference.

FIELD

Embodiments described herein relate generally to a generation method, a generation device, a generation system, a program, and a storage medium.

BACKGROUND

Production may include performing a heat treatment process that utilizes a thermal activation process. It is favorable for the conditions of the heat treatment in the heat treatment process to be more efficient.

DETAILED DESCRIPTION

Figure 1:
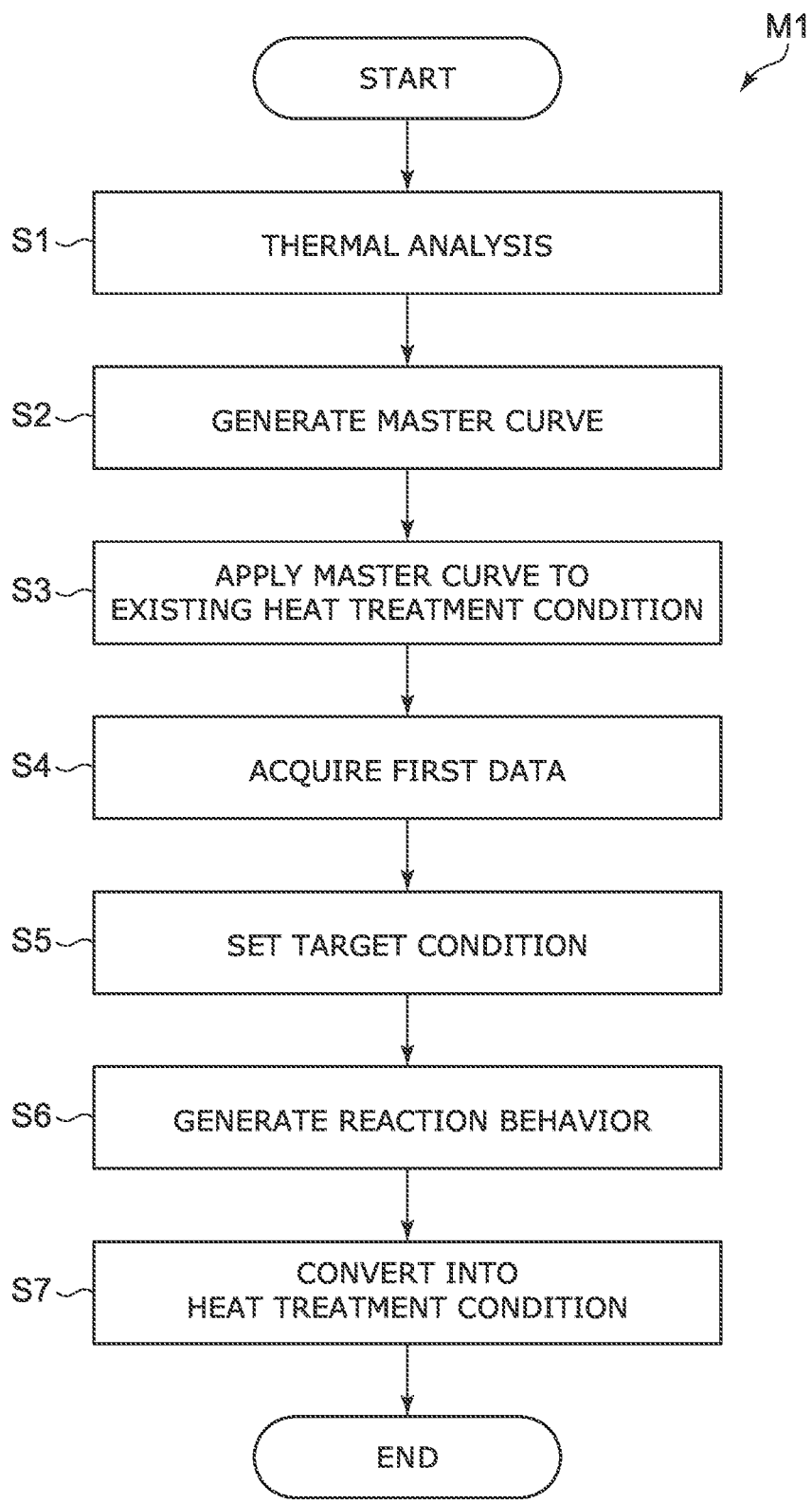
FIG. 1 is a flowchart showing a generation method according to an embodiment.

In a generation method according to one embodiment, a master curve of a relationship between an extent of reaction and a heat treatment condition is generated using a thermal analysis result of a member. Also, in the generation method, first data that is related to a first heat treatment condition of a relationship between time and temperature is generated using the first heat treatment condition and the master curve. Also, in the generation method, a second heat treatment condition of a relationship between time and temperature is calculated using the master curve and a target condition for heat treatment.

Exemplary embodiments will now be described with reference to the drawings. In the specification of the application and the drawings, components similar to those described in regard to a drawing thereinabove are marked with like reference numerals; and a detailed description is omitted as appropriate.

FIG. 1 is a flowchart showing a generation method according to an embodiment.

The generation method according to the embodiment is used to generate a heat treatment condition. As shown in FIG. 1, the generation method M1 according to the embodiment includes steps S1 to S7. First, thermal analysis of the object of the heat treatment is performed (step S1). In the thermal analysis, a characteristic with respect to the temperature change of the object is recorded. For example, a thermogravimetric change rate, a heat shrinkage rate, an elastic modulus, a heat flow change, or the like is recorded as the characteristic. The thermogravimetric change rate can be measured by a thermogravimeter. The heat shrinkage rate can be measured by a heat shrinkage rate measuring device or a thermomechanical analyzer. The elastic modulus can be measured by a dynamic thermomechanical analyzer. The heat flow change can be measured by a differential scanning calorimeter. The thermal analysis is performed using not less than two different temperature profiles.

The temperature profiles show the conditions of the temperature change with respect to time. For example, multiple temperature profiles that have mutually-different heating rates are used in the thermal analysis. Multiple temperature profiles that include mutually-different cooling rates may be used.

Figure 2:
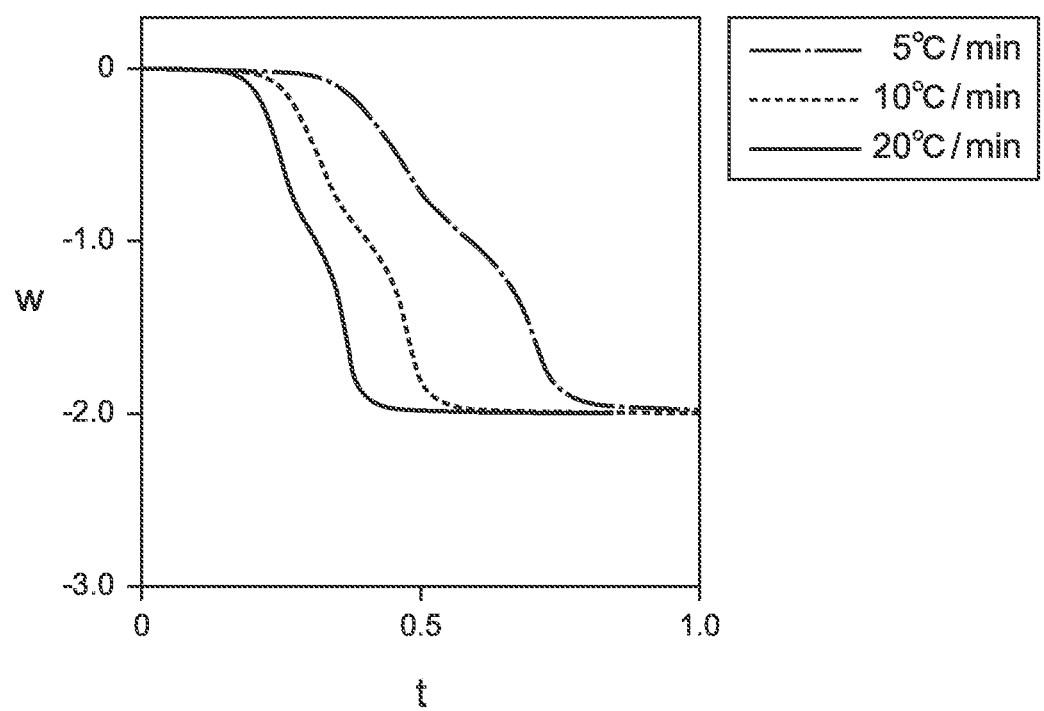
FIG. 2 is a graph illustrating a thermal analysis result.

FIG. 2 is a graph illustrating the thermal analysis result.

The horizontal axis of FIG. 2 is a time t. The vertical axis is a weight change rate w. The horizontal axis and the vertical axis have values of arbitrary units. The graph shows the thermal analysis results when the member is heated at three heating conditions having mutually-different heating rates. In the example of FIG. 2, the weight change rate with respect to time is different between the heating conditions. Also, the weight change rate with respect to time increases as the heating rate increases.

A master curve is generated using the thermal analysis result (step S2). The master curve is a function of a relationship between the extent of reaction and the heat treatment condition. According to one embodiment, the master curve is represented by the following Formula 1. In Formula 1, x is the extent of reaction. t is the time. T is the temperature. Q is the activation energy. R is the gas constant. Θ(t, T) is a function that includes the time t and the temperature T as variables. Θ(t, T) is a quantification of the heat treatment condition made by summing the history from the point in time of starting the heat treatment to any time t and temperature T.

$$f(x) = \Theta(t, T) = \int_0^t T^m \exp\left(-\frac{Q}{RT}\right) t^n dt \quad \text{[Formula 1]}$$

In Formula 1, m and n are variables set according to the phenomenon that occurs when heating. For example, a chemical reaction, atomic diffusion, sintering, or drying are examples of phenomena that may occur when heating. The chemical reaction is a chemical combination, decomposition, etc. For example, atomic diffusion includes carburizing, ion implantation, sintering in which the member is bonded at a temperature that is not more than the melting point, etc. Other examples of atomic diffusion include the diffusion of atoms from a solid surface into the interior when forming an alloy, a compound, etc. Thermal oxidation, sulfidization, etc., are examples of processing in which diffusion from the solid surface into the interior occurs. Drying includes volatilization, sublimation, etc. When generating a master curve related to a chemical reaction or drying, m and n are set to "0". For atomic diffusion, m is set to "0" and n is set to "−½" when generating a master curve related to diffusion at the solid surface. When generating a master curve related to sintering, m is set to "−1", and n is set to "0".

The master curve can be generated utilizing known master sintering curve theory. Summarily, first, a thermal analysis result is acquired at each heating condition; and the change of the characteristic is plotted versus $\Theta(t, T)$. In the example shown in FIG. 2, the characteristic is the weight change rate. The different temperature profiles are plotted, and the value of Q is calculated to minimize the distance between the plots. Thereby, a single curve of the relationship between $\Theta(t, T)$ and the characteristic is obtained. This curve is the master curve.

Figure 3:
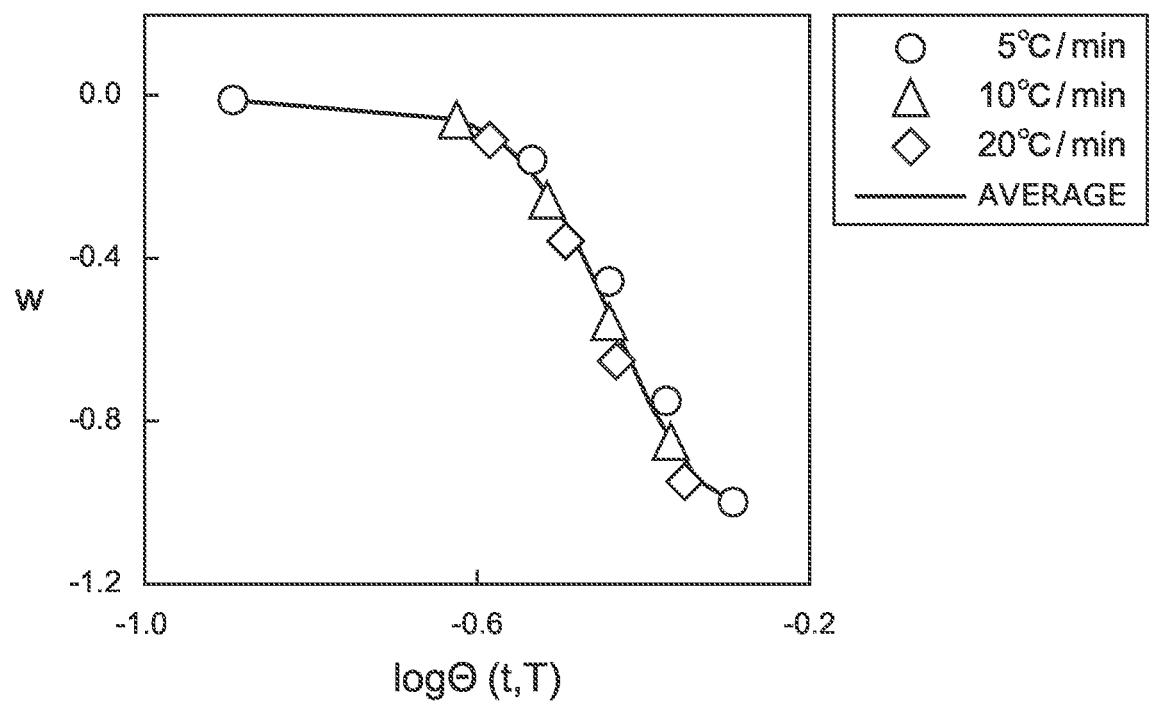
FIG. 3 is a graph illustrating a master curve.

FIG. 3 is a graph illustrating a master curve.

The horizontal axis of FIG. 3 is log $\Theta(t, T)$. The vertical axis is the weight change rate w. The horizontal axis and the vertical axis have values of arbitrary units. The graph shows a portion of analysis results of the three heating conditions having mutually-different heating rates as well as the average of the overall analysis result. It can be seen from FIG. 3 that the changes of the characteristic for the mutually-different heating conditions converge to a single curve.

The extent of reaction of an existing heat treatment condition (a first heat treatment condition) is calculated by applying the master curve to the first heat treatment condition (step S3). As described above, the master curve is of the relationship between the extent of reaction and the heat treatment condition. The change of the temperature T with respect to the time t is defined by the heat treatment condition. The heat treatment condition can be converted into the extent of reaction by using the master curve. The extent of reaction is the degree of progress of the reaction with respect to the time and the temperature. Also, the reaction behavior of the change of the extent of reaction with respect to time is obtained from the converted extent of reaction.

Figure 4A:
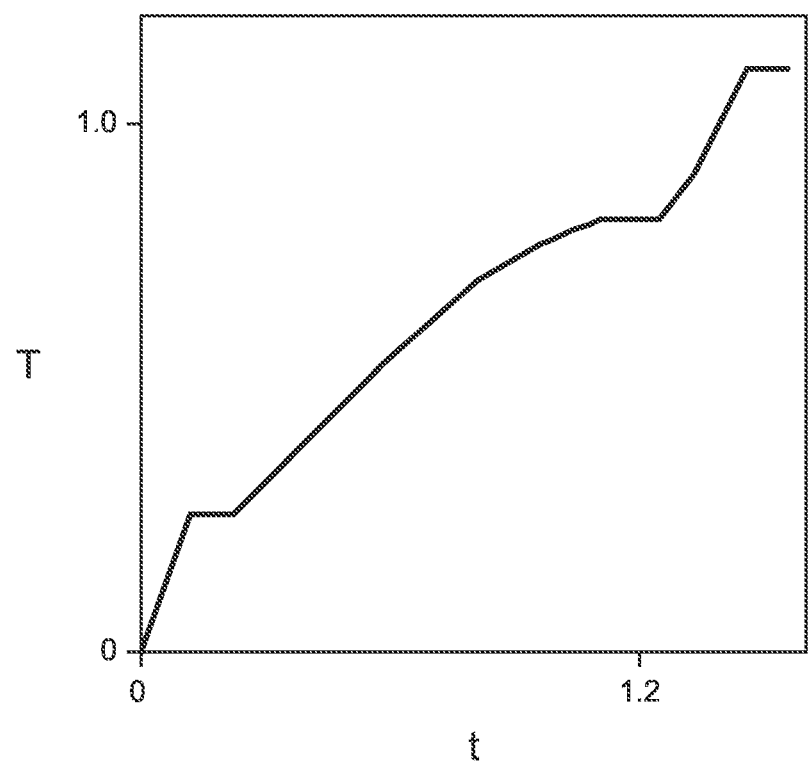
FIG. 4A is a graph illustrating a heat treatment condition.
Figure 4B:
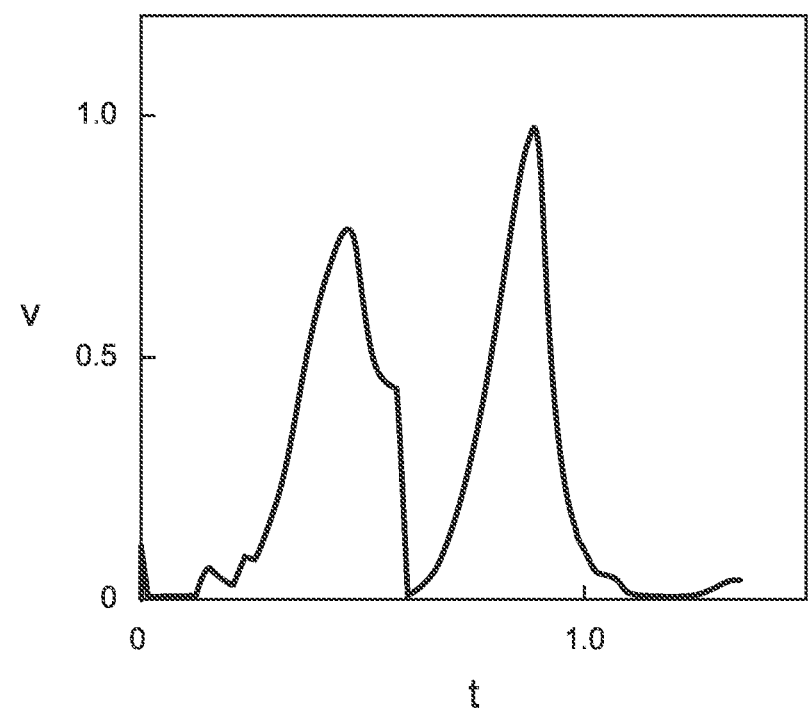
FIG. 4B is a graph illustrating a reaction behavior of the heat treatment condition of FIG. 4A.

FIG. 4A is a graph illustrating the heat treatment condition. FIG. 4B is a graph illustrating the reaction behavior of the heat treatment condition of FIG. 4A.

In FIG. 4A, the horizontal axis is the time t, and the vertical axis is the temperature T. In FIG. 4B, the horizontal axis is the time t, and the vertical axis is a reaction rate v. The reaction rate v can be calculated from the extent of reaction, and is the change of the extent of reaction with respect to time. The horizontal axis and the vertical axis have values of arbitrary units.

The reaction behavior (a first reaction behavior) shown in FIG. 4B is obtained by applying master curves to the heat treatment condition shown in FIG. 4A. In the example shown in FIG. 4B, two peaks appear in the reaction rate v; and two reactions occur. When multiple reactions occur, master curves are generated respectively for the reactions; and the heat treatment condition is converted into the reaction behavior by using the multiple master curves.

First data is acquired from the reaction behavior (step S4). For example, the first data is the score of the evaluation of the first reaction behavior. The score S can be calculated using the following Formulas 2 and 3. In Formulas 2 and 3, n is the number of reactions that occur for the heat treatment condition. $S_i$ is the score related to the ith reaction. 6 is the processing time of the ith reaction. $t_{ideal}$ is the processing time for the ideal condition of the ith reaction. $A_i$ is the surface area of the ith reaction in the graph. In other words, $A_i$ is the integral of the reaction rate v over the time t for the ith reaction. $V_i$ is the maximum value of the reaction rate v in the ith reaction.

$$S_i = \frac{t_i}{t_{ideal}} = \frac{t_i}{A_i/V_i} \quad \text{[Formula 2]}$$

$$S = \sum_{i=1}^{n} \frac{S_i}{n} \quad \text{[Formula 3]}$$

For example, the score increases as the efficiency of the reaction increases. The user can ascertain from the score how efficiently the reaction occurs at the first heat treatment condition. Or, values such as $t_i$, $V_i$, $A_i$, etc., may be calculated from the first reaction behavior as the first data. These values can be utilized when the user sets the constraint condition or the target condition described below. Or, the first data may be the reaction behavior obtained from the existing heat treatment condition. From the reaction behavior, the extent of reaction at each time can be checked, and how efficiently the reaction progresses at each time can be ascertained. The score, the reaction behavior, and at least one selected from $t_i$, $V_i$, $A_i$, etc., may be acquired as the first data.

The target condition for the heat treatment is set (step S5). The target condition is the target when generating the reaction behavior; and parameters that minimize, maximize, or cause to approach a desired value are determined by the target condition. A condition related to the progress of the reaction, a condition related to time, etc., are set as the target condition. For example, production leveling of the reaction rate, the separation of two or more reactions, etc., are set as the target condition related to the progress of the reaction. For production leveling, a reaction rate that is used as a reference is set. Production leveling of the reaction rate is performed to minimize the difference from the reference reaction rate. The minimization of the processing time or the like is set as the condition related to time. Two or more target conditions may be set.

A constraint condition also may be set for the heat treatment. The constraint condition is a constraint when generating the reaction behavior; and the conditions to be satisfied by the parameters are determined according to the constraint condition. A condition related to the progress of the reaction, a condition related to the temperature, a condition related to time, etc., are set as the constraint condition. For example, the upper limit of the reaction rate is set as a constraint condition related to the progress of the reaction. A maximum temperature, a heating rate, or the like is set as a constraint condition related to the temperature. The upper limit of the processing time or the like is set as a constraint condition related to time. Two or more constraint conditions may be set.

The user may refer to the first data obtained from the first reaction behavior when setting the target condition or the constraint condition. As an example, the first data includes the maximum value of the reaction rate. The user refers to the maximum value of the reaction rate to set the reference value when performing production leveling of the reaction rate.

The reaction behavior (a second reaction behavior) that matches the target condition is generated by using the target condition that is set (step S6). When the constraint condition is set, the second reaction behavior that satisfies the constraint condition is generated. Another target condition or another constraint condition is re-input when a reaction behavior that satisfies the constraint condition cannot be generated. The second reaction behavior is converted into the corresponding heat treatment condition (the corresponding second heat treatment condition) by applying the master curve to the second reaction behavior (step S7).

Figure 5A:
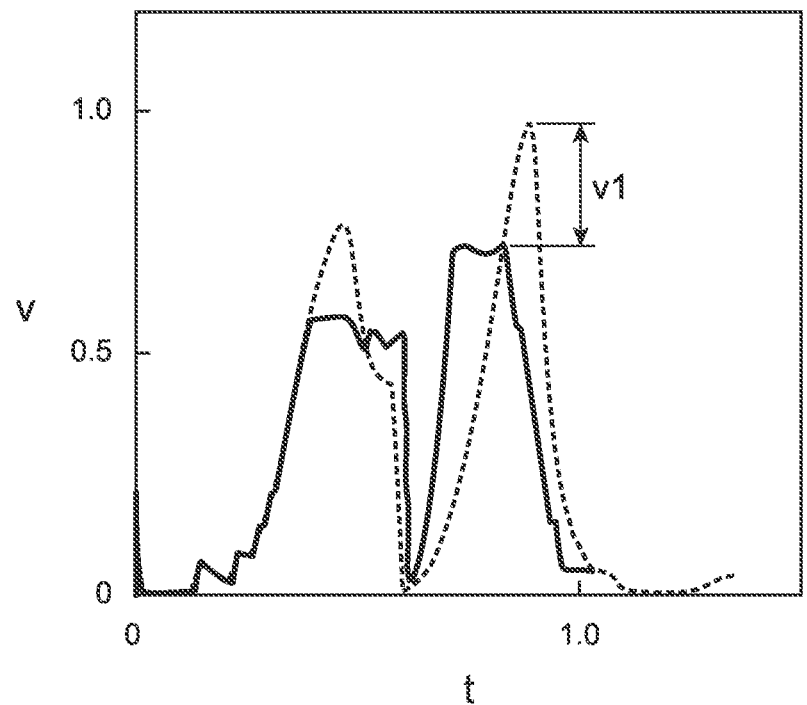
FIG. 5A is a graph illustrating a reaction behavior generated using a target condition and a constraint condition.
Figure 5B:
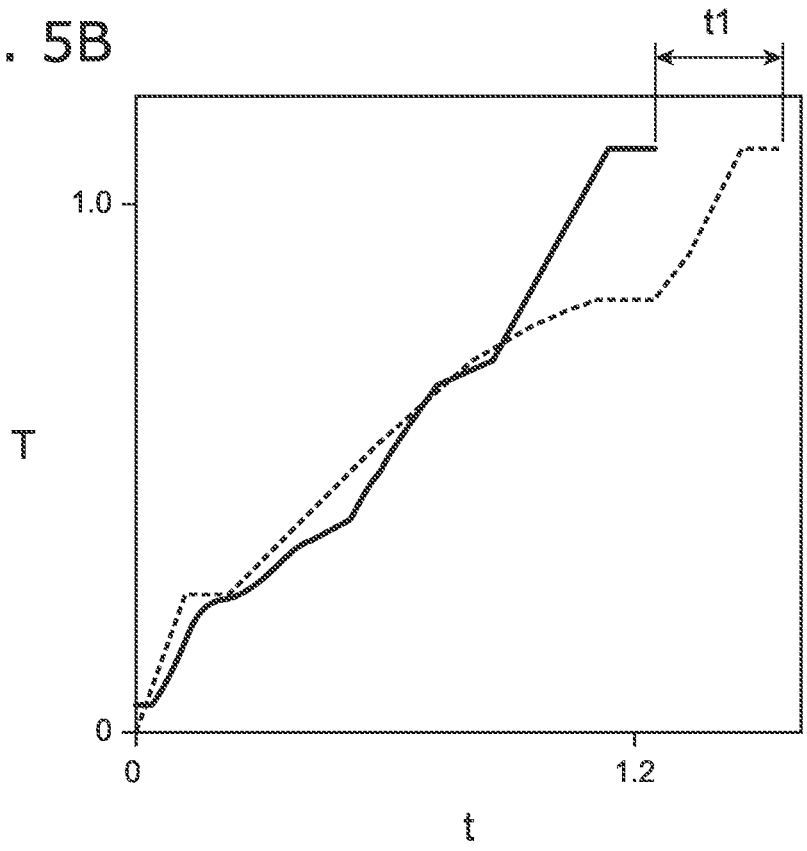
FIG. 5B is a graph illustrating a heat treatment condition corresponding to the reaction behavior of FIG. 5A.

FIG. 5A is a graph illustrating a reaction behavior generated using the target condition and the constraint condition. FIG. 5B is a graph illustrating a heat treatment condition corresponding to the reaction behavior of FIG. 5A.

FIG. 5A is an example of the reaction behavior that is generated. FIG. 5B is an example of the heat treatment condition obtained by applying the master curve to the reaction behavior shown in FIG. 5A. In FIG. 5A, the horizontal axis is the time t, and the vertical axis is the reaction rate v. In FIG. 5B, the horizontal axis is the time t, and the vertical axis is the temperature T. The horizontal axis and the vertical axis have values of arbitrary units. The reaction behavior shown in FIG. 4B is shown by a broken line in FIG. 5A. The heat treatment condition shown in FIG. 4A is shown by a broken line in FIG. 5B.

It can be seen in FIG. 5B that the overall processing time of the newly-generated second heat treatment condition is reduced by the amount of a time t1 compared to the existing first heat treatment condition. Also, it can be seen from FIG. 5A that the maximum value of the reaction rate of the second heat treatment condition is reduced by the amount of a value v1 compared to the first heat treatment condition. The reduction of the processing time means higher efficiency of the reaction and may increase the productivity. The reduction of the maximum value of the reaction rate may reduce the load on the product or may reduce the load on ancillary equipment that processes exhaust fumes generated in the heat treatment.

Advantages of the embodiment will now be described.

In production, a heat treatment process that utilizes a thermal activation process may be performed. The thermal activation process is a chemical reaction, atomic diffusion, sintering, drying, etc. Conventionally, the relationship between the time and the temperature in heat treatment processes is set based on experience, repeated experiment results, etc. According to a conventional method, it is not easy to discover a wasteful heat treatment condition. Also, it is difficult to optimize the heat treatment condition because it is difficult to predict the effects on the reaction behavior when modifying the heat treatment condition.

According to the embodiment, this problem is addressed by using a master curve to generate the heat treatment condition. The master curve is of a relationship between the extent of reaction and the heat treatment condition. By generating the master curve, the progress of the reaction can be ascertained for the object member. A more efficient heat treatment condition can be generated by using the generated master curve and the target condition for the heat treatment. Also, by applying the master curve to an existing heat treatment condition, waste that is related to the existing heat treatment condition can be identified, or useful data when generating a new heat treatment condition can be obtained. According to the embodiment, data that is related to the existing heat treatment condition can be obtained, and a more efficient heat treatment condition can be generated.

Formula 1 is used for the master curve. Formula 1 can be adapted to the four phenomena of a chemical reaction, atomic diffusion, sintering, and drying by setting the parameters according to the phenomenon. Therefore, the method according to the embodiment can be adapted to a wider range of thermal activation processes.

According to the method according to the embodiment, even when multiple reactions occur in the object member in the heat treatment, an appropriate heat treatment condition can be generated by generating the master curve by calculating the activation energy for each of the reactions.

In the generation method described above, the master curve is applied to the first heat treatment condition to obtain data that can be utilized to set the constraint condition or the target condition, to evaluate the existing first heat treatment condition, etc. When the evaluation, the utilizable data, etc., are unnecessary, the application of the master curve to the first heat treatment condition is omissible.

The method according to the embodiment may be performed by a human; and at least a portion of the method may be performed by a device.

Figure 6:
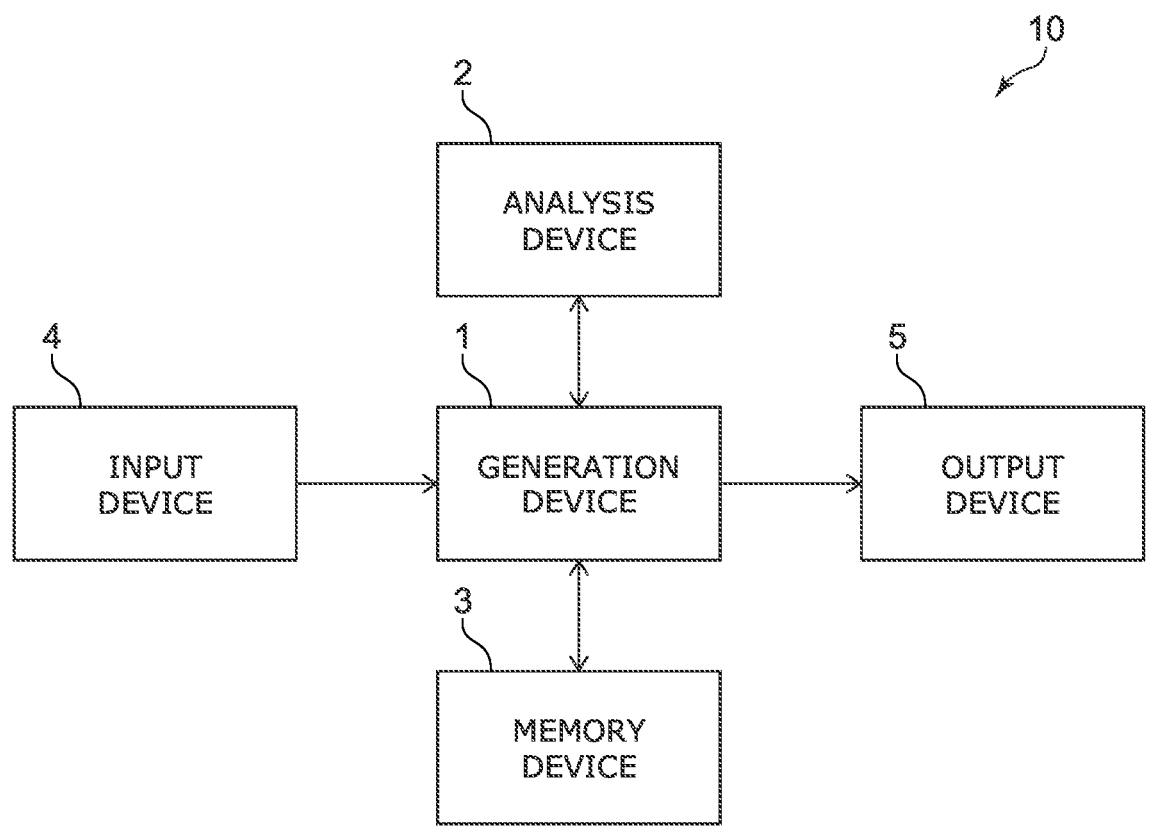
FIG. 6 is a schematic view showing a generation system according to the embodiment.

FIG. 6 is a schematic view showing a generation system according to the embodiment.

The generation system 10 is used to generate the heat treatment condition and includes a generation device 1, an analysis device 2, a memory device 3, an input device 4, and an output device 5 as shown in FIG. 6.

The generation device 1 performs various processing related to the generation of the heat treatment condition. The analysis device 2 performs thermal analysis related to the object member. The memory device 3 appropriately stores data used to generate the heat treatment condition and data obtained by the processing of the generation device 1. The user uses the input device 4 to input data to the generation device 1. The output device 5 externally outputs the data transmitted from the generation device 1.

First, the analysis device 2 performs thermal analysis. The analysis device 2 may automatically perform the thermal analysis according to a command transmitted from the generation device 1. The conditions when performing the thermal analysis are preset by the user. The generation device 1 acquires the thermal analysis result of the analysis device 2. For example, the generation device 1 receives the thermal analysis result from the analysis device 2. The thermal analysis result may be stored in a storage medium; and the generation device 1 may acquire the thermal analysis result from the storage medium. The user may transfer the thermal analysis result from the analysis device 2 to the generation device 1.

The generation device 1 uses the thermal analysis result to generate the master curve. Also, the generation device 1 accepts an input of the existing first heat treatment condition. The first heat treatment condition may be input using the input device 4 or may be stored in the memory device 3. The generation device 1 generates the first data by using the first heat treatment condition and the master curve and causes the output device 5 to output the first data.

The user uses the input device 4 to input the target condition or the constraint condition. Or, the generation device 1 may automatically set the target condition or the constraint condition based on the first data by following a preset rule. The generation device 1 uses the master curve, the target condition, and the constraint condition to generate the reaction behavior. The generation device 1 uses the master curve to convert the reaction behavior into a heat treatment condition. The generation device 1 causes the output device 5 to output the converted heat treatment condition and stores the converted heat treatment condition in the memory device 3.

Figure 7:
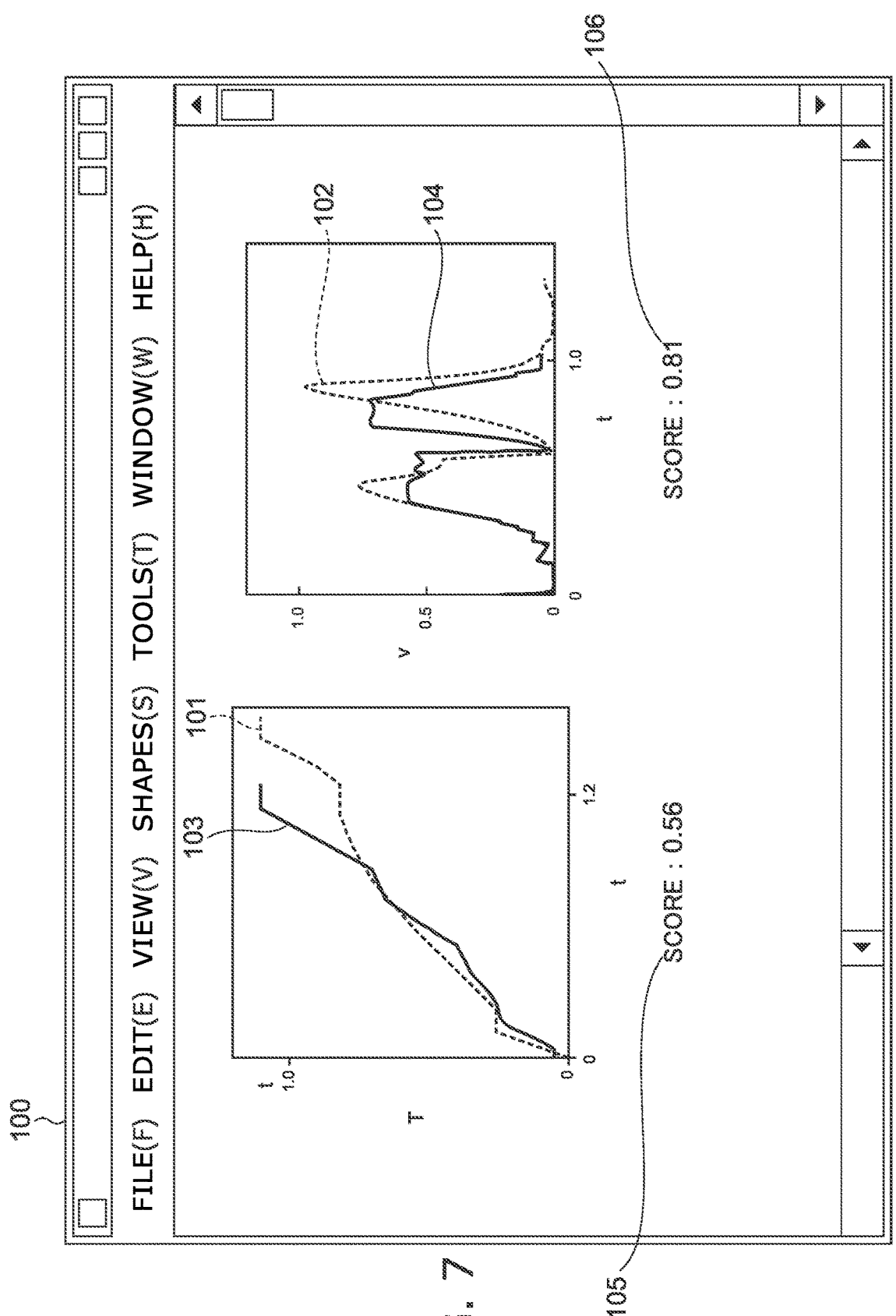
FIG. 7 is a schematic view showing a user interface according to a generation device according to the embodiment.
Figure 8:
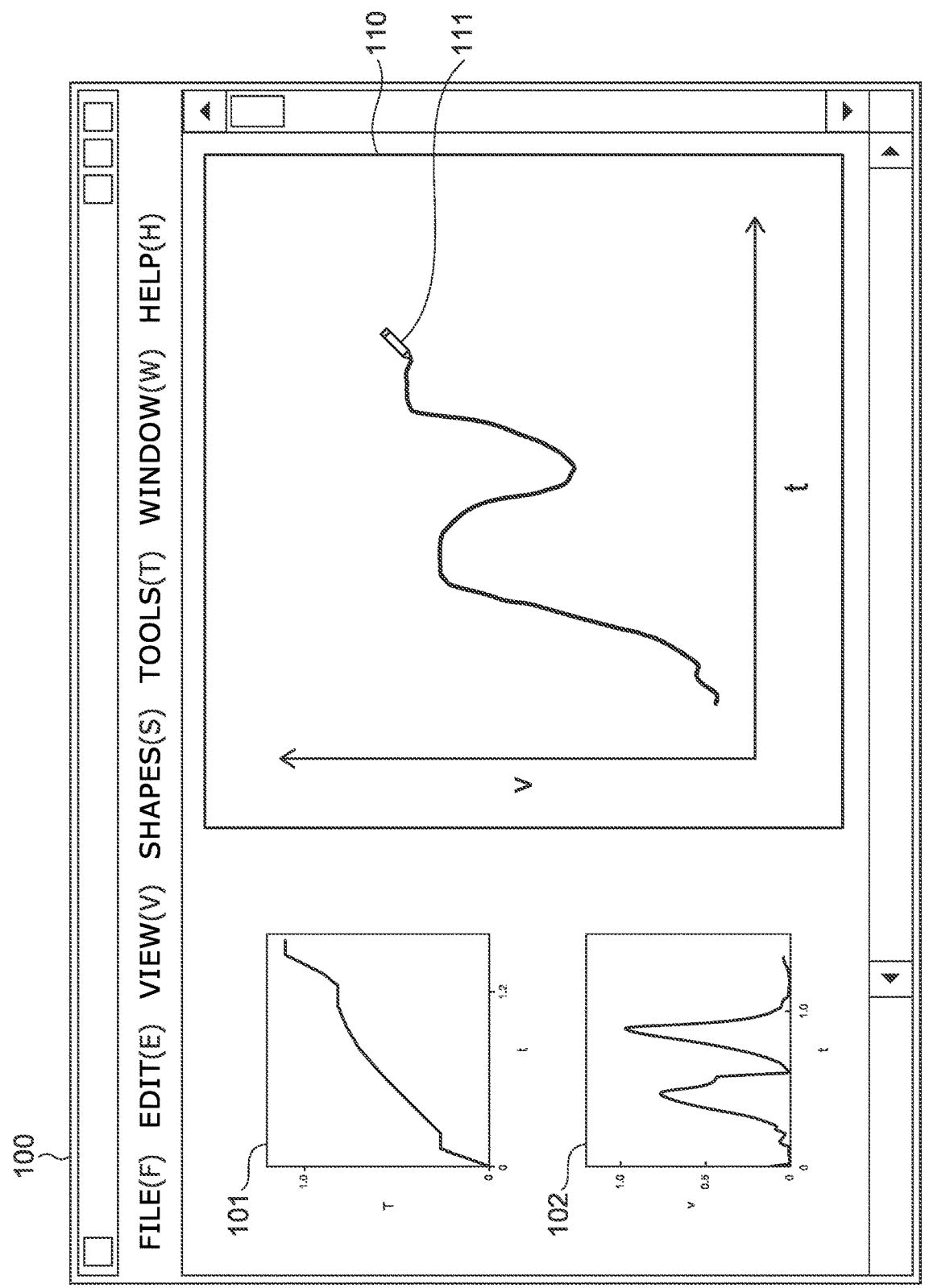
FIG. 8 is a schematic view showing the user interface according to the generation device according to the embodiment.

FIGS. 7 and 8 are schematic views showing a user interface according to the generation device according to the embodiment.

For example, the output device 5 is a monitor. As shown in FIG. 7, the generation device 1 displays the user interface (UI) 100. To improve the convenience of the user, it is favorable for the generation device 1 to cause the UI 100 to display an existing condition, a score of the first heat treatment condition, and a new condition. The existing condition is one or two selected from the existing first heat treatment condition and the first reaction behavior that corresponds to the first heat treatment condition. The new condition is one or two selected from the newly-generated second reaction behavior and the second heat treatment condition that corresponds to the second reaction behavior. For example, the generation device 1 causes the UI 100 to display the existing condition, the score, and the new condition according to the input of the thermal analysis result, the first heat treatment condition, and the target condition.

In the example of FIG. 7, a first heat treatment condition 101, a first reaction behavior 102, a second heat treatment condition 103, a second reaction behavior 104, a score 105 of the first heat treatment condition, and a score 106 of the second heat treatment condition are displayed in the UI 100. By such a display, the user can easily ascertain how efficient the first heat treatment condition is, how much more efficient the second heat treatment condition is compared to the first heat treatment condition, etc.

The target condition and the constraint condition may be input to the UI by drawing the reaction behavior. For example, as shown in FIG. 8, the generation device 1 causes the UI 100 to display a drawing region 110. The user draws the reaction behavior in the drawing region 110 by using the input device 4 to operate a pointer 111. The generation device 1 accepts the reaction behavior that is drawn. The generation device 1 calculates the target condition and the constraint condition from the input reaction behavior. For example, the generation device 1 calculates the processing time and the maximum reaction rate from the input reaction behavior and sets the target condition and the constraint condition based on these values.

When drawing the reaction behavior, it is favorable for the existing condition to be displayed as shown in FIG. 7. Thereby, even a user that has little experience or knowledge can easily draw the reaction behavior by referring to the existing condition.

When the phenomenon that occurs in the heat treatment is known, the parameters m and n of Formula 1 can be set when generating the master curve. When the phenomenon that occurs is unknown, the generation device 1 may automatically set the parameters m and n that are most suited to the thermal analysis result. For example, the generation device 1 substitutes the values of the three combinations described above for the parameters m and n. The generation device 1 determines the combination of values that gives the best thermal analysis result and uses the combination of values to generate the master curve.

Figure 9:
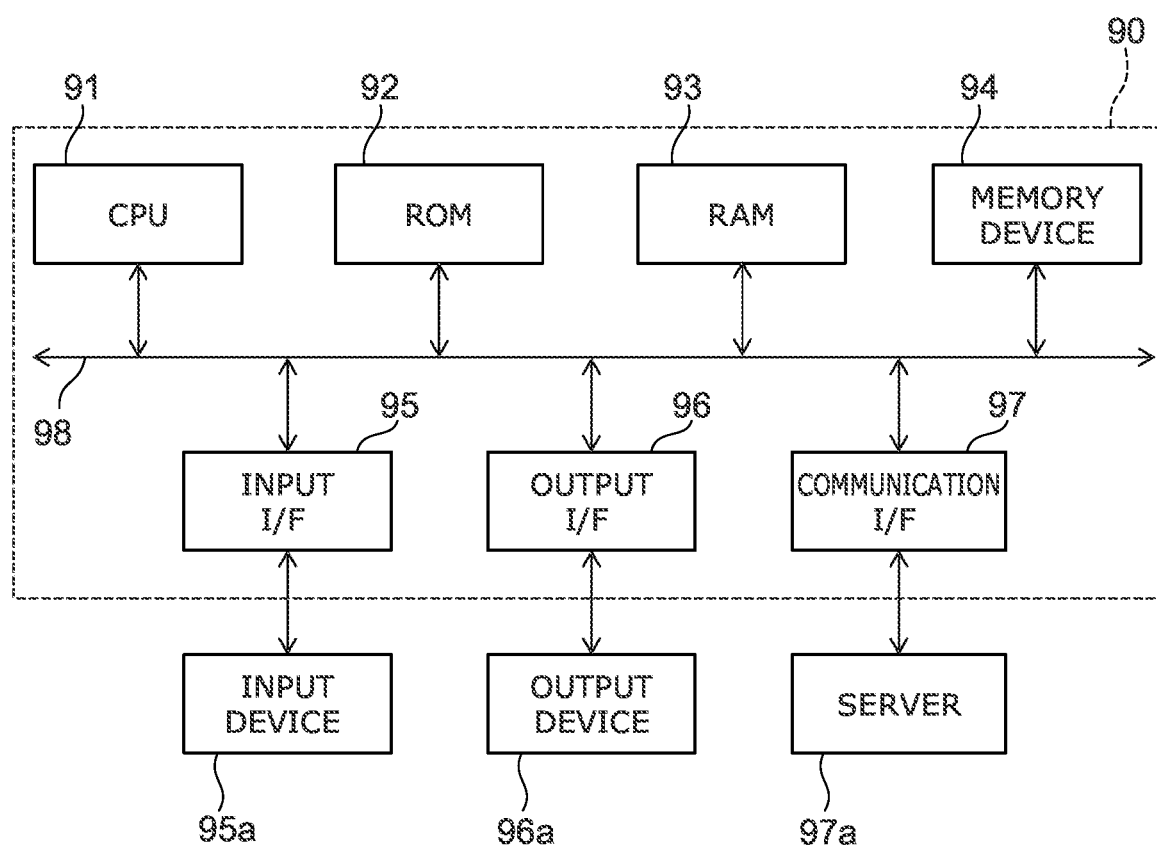
FIG. 9 is a schematic view showing a hardware configuration.

FIG. 9 is a schematic view showing a hardware configuration.

The generation device 1 includes, for example, the configuration of a computer 90 shown in FIG. 9. The computer 90 includes a CPU 91, ROM 92, RAM 93, a memory device 94, an input interface 95, an output interface 96, and a communication interface 97.

The ROM 92 stores programs that control the operations of the computer 90. A program that is necessary for causing the computer 90 to realize the processing described above is stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the program, the CPU 91 performs various processing by controlling configurations via a system bus 98.

The memory device 94 stores data necessary for executing the programs and data obtained by executing the programs.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and an output device 96a. The output I/F 96 is, for example, an image output interface such as Digital Visual Interface (DVI), High-Definition Multimedia Interface (HDMI (registered trademark)), etc. The CPU 91 can transmit the data to the output device 96a via the output I/F 96 and can cause the output device 96a to display the image.

The communication interface (I/F) 97 connects the computer 90 and a server 97a that is outside the computer 90. The communication I/F 97 is, for example, a network card such as a LAN card, etc. The CPU 91 can read various data from the server 97a via the communication I/F 97.

The memory device 94 includes not less than one selected from a Hard Disk Drive (HDD) and a Solid State Drive (SSD). The input device 95a includes not less than one selected from a mouse, a keyboard, a microphone (audio input), and a touchpad. The output device 96a includes not less than one selected from a monitor and a projector. A device such as a touch panel that functions as both the input device 95a and the output device 96a may be used. The memory device 94, the input device 95a, and the output device 96a can be used respectively as the memory device 3, the input device 4, and the output device 5.

The functions of the generation device 1 may be realized by the collaboration of multiple computers. The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or a recording medium (non-transitory computer-readable storage medium) that can be read by another nontemporary computer.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

According to the generation method, the generation device, and the generation system described above, a more efficient heat treatment condition can be generated. Similar effects can be obtained by using a program to cause a computer to perform the generation method.

While certain embodiments have been described, these embodiments have been presented by way of example only, and are not intended to limit the scope of the inventions.

Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions. Embodiments described above can be implemented in combination with each other.

What is claimed is:

1. A generation method, comprising:
performing thermal analysis of a member subject to heat treatment under at least two different heating conditions to generate a plurality of thermal analysis results with respect to a temperature change of the member in response to each respective heating condition;
generating a master curve by using the thermal analysis results of the member, the master curve being of a relationship between an extent of reaction and a heat treatment condition;
receiving an input of a target condition from a user;
generating first data related to a first heat treatment condition, which corresponds to an existing treatment condition, by using the first heat treatment condition and the master curve, the first heat treatment condition being of a relationship between a time and a temperature;
calculating a second heat treatment condition by using the master curve and the inputted target condition for the heat treatment, the second heat treatment condition being of a relationship between a time and a temperature; and
displaying, as an output, the first heat treatment condition, a first reaction behavior, the second heat treatment condition, a second reaction behavior, and scores that respectively represent an evaluation of the first reaction behavior and an evaluation of the second reaction behavior,
wherein the first reaction behavior including the first heat treatment condition converted using the master curve,
the second reaction behavior corresponding to the second heat treatment condition, and
the first data being related to the first heat treatment condition.

2. The method according to claim 1, wherein
the second heat treatment condition is calculated by further using a constraint condition for the heat treatment.

3. The method according to claim 1, wherein
the first reaction behavior is of a change of an extent of reaction with respect to time, a score is calculated as the first data, and
the score is of an evaluation of the first reaction behavior.

4. The method according to claim 1, wherein
the master curve includes a parameter corresponding to at least one of a plurality of phenomena that may occur in heat treatment, and
in the case where one of the plurality of phenomena is selected, the second heat treatment condition is generated by setting the parameter to a value corresponding to the selected one phenomenon.

5. The method according to claim 1, wherein
the master curve is generated for each of a plurality of reactions when the plurality of reactions occurs in heat treatment, and
the second heat treatment condition is generated using the target condition and a plurality of the master curves.

6. The method according to claim 1, further comprising:
displaying a drawing region on a display interface,
receiving an input from the user of a drawing of a desired reaction behavior, and
calculating the inputted target condition from the inputted drawing of the reaction behavior.

7. A system comprising:
a generation device configured to
perform thermal analysis of a member subject to heat treatment under at least two different heating conditions to generate a plurality of thermal analysis results with respect to a temperature change of the member in response to each respective heating condition,
generate a master curve by using the thermal analysis results of the member, the master curve being of a relationship between an extent of reaction and a heat treatment condition,
receive an input of a target condition from a user,
generate first data related to a first heat treatment condition, which corresponds to an existing treatment condition, by using the first heat treatment condition and the master curve, the first heat treatment condition being of a relationship between a time and a temperature, and
calculate a second heat treatment condition by using the master curve and the inputted target condition for the heat treatment, the second heat treatment condition being of a relationship between a time and a temperature; and
an output device configured to display, as an output, the first heat treatment condition, a first reaction behavior, the second heat treatment condition, a second reaction behavior, and scores that respectively represent an evaluation of the first reaction behavior and an evaluation of the second reaction behavior,
wherein the first reaction behavior including the first heat treatment condition converted using the master curve,
the second reaction behavior corresponding to the second heat treatment condition,
the first data being related to the first heat treatment condition.

8. A non-transitory computer readable medium that stores a program that when executed by a system, causes the system to perform a method comprising:
performing thermal analysis of a member subject to heat treatment under at least two different heating conditions to generate a plurality of thermal analysis results with respect to a temperature change of the member in response to each respective heating condition;
generating a master curve by using the thermal analysis results of the member, the master curve being of a relationship between an extent of reaction and a heat treatment condition;
receiving an input of a target condition from a user;
generating first data related to a first heat treatment condition, which corresponds to an existing treatment condition, by using the first heat treatment condition and the master curve, the first heat treatment condition being of a relationship between a time and a temperature;
calculating a second heat treatment condition by using the master curve and the inputted target condition for the heat treatment, the second heat treatment condition being of a relationship between a time and a temperature; and displaying, as an output, the first heat treatment condition, a first reaction behavior, the second heat treatment condition, a second reaction behavior, and scores that respectively represent an evaluation of the first reaction behavior and an evaluation of the second reaction behavior, wherein the first reaction behavior including the first heat treatment condition converted using the master curve, the second reaction behavior corresponding to the second heat treatment condition, and the first data being related to the first heat treatment condition.

* * * * *